(No Model.)
H. T. FELLOWS.
SOLDERING PAN OR TABLE.
No. 580,265. 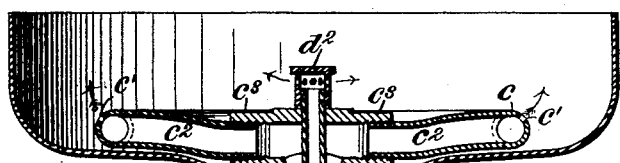 Patented Apr. 6, 1897.
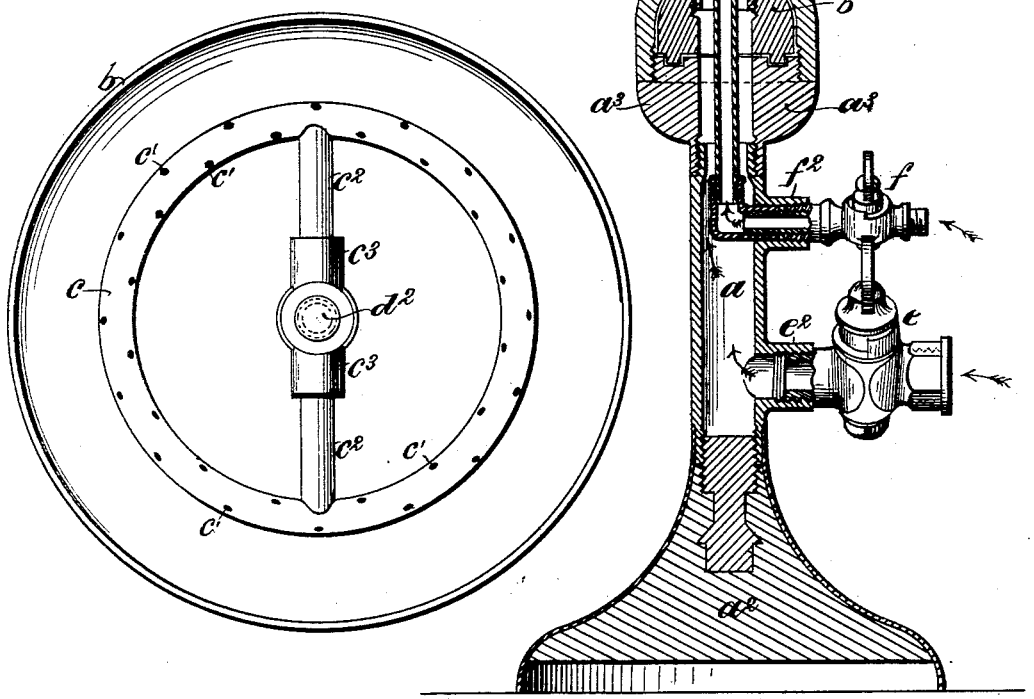
Witnesses.
Robert Everitt.
Geo. W. Rea.
Inventor:
Henry Thomas Fellows
By James L. Norris
Atty.

UNITED STATES PATENT OFFICE.

HENRY THOMAS FELLOWS, OF ACOCK'S GREEN, ENGLAND, ASSIGNOR TO THE ELKINGTON & COMPANY, LIMITED, OF BIRMINGHAM, ENGLAND.

SOLDERING PAN OR TABLE.

SPECIFICATION forming part of Letters Patent No. 580,265, dated April 6, 1897.

Application filed September 19, 1896. Serial No. 606,403. (No model.)

*To all whom it may concern:*

Be it known that I, HENRY THOMAS FELLOWS, a subject of the Queen of Great Britain, residing at Acock's Green, England, have invented a certain useful, new, or Improved Soldering or Brazing Table or Soldering or Brazing Pan; and I do hereby declare that the following is a full, clear, and exact description of the invention, which will enable others skilled in the art to which it appertains to make and use the same.

The said invention consists of the soldering or brazing table or pan hereinafter described for facilitating the soldering of rims to flat or shallow articles or vessels, such, for example, as the rims of German-silver trays to the flat portion or body of the tray.

I will describe the said invention in connection with the soldering of the rim of a German-silver tray to the body of the tray, but the said invention, as hereinafter pointed out, may be used for soldering together the parts of various metallic articles.

By the said invention a large saving of gas is effected.

In constructing a soldering table or pan according to the said invention I take a circular shallow metallic dish or pan, preferably of iron, which I mount upon a stand, the said dish or pan being capable of a rotary motion on the said stand. The vertical shaft of the said stand consists of two concentric tubes, the inner one being much smaller in diameter than the outer one, so that there is considerable space between the said tubes. The lower ends of the said tubes are connected, respectively, with stop-cocks, through which air under pressure may be supplied. The smaller inner tube terminates in the center of the pan in a small rose-jet. The outer tube communicates with a tubular ring in the interior of the pan, which ring has a diameter preferably about one-half that of the pan. The said ring has a series of small jet-holes made in it, through which air under pressure may be delivered. The ring described is fixed to the interior of the pan and rotates with it.

In using the said new or improved soldering-table or soldering-pan ignited coke or charcoal is introduced into the said pan, and the body of the tray is placed upon the said pan. Compressed air is passed through the tubular stand, by which air the combustion of the coke or charcoal is maintained, and the body of the tray is rapidly raised to the temperature at which the rim may be soldered to it. The ordinary blowpipe being ignited, its flame is applied to the edges of the parts in contact, and by a slow rotation of the pan or table all portions of the edges to be soldered are in succession brought under the action of the blowpipe. The vertical shaft of the said stand has a number of passages equal to the number of jets, and each passage has a stop-cock for turning on, shutting off, and regulating the current of compressed air passing through it.

Figures 1 and 2 are respectively a central vertical section and a plan view of a soldering-table in which my invention is incorporated.

$a$ is the hollow vertical pillar of the base or stand $a^2$, on which vertical pillar $a$ the metallic dish, pan, or hearth $b$ for receiving the ignited coke or charcoal is mounted so as to be capable of a rotary motion. The dish, pan, or hearth $b$ has an axial tubular part $b^2$, connected to a nearly hemispherical tubular part or block $b'$, working on a second block $a^3$, fixed on the top of the pillar $a$. The bearing-block $b'$ is kept in position on the block $a^3$ by an inverted cup $a'$, screwed on the said block $a^3$. It will thus be seen that when the pan or hearth $b$ is turned the bearing-block $b'$ rotates on the block $a^3$ and within the inverted cup $a'$.

It will be seen by reference to the drawings that the tubular part $b^2$ of the rotary pan or hearth $b$ virtually constitutes a continuation or prolongation of the hollow pillar $a$ of the stand.

To the top of the tubular part $b^2$ of the pan or hearth $b$ the ring $c$, having the series of holes or jets $c'$ $c'$, is connected by the crossing tube $c^2$ and T-joint $c^3$, so that the said ring-jets rotate with the pan or hearth $b$.

In the vertical pillar $a$ is a smaller fixed concentric tube $d$, surmounted by a rose-jet $d^2$. The vertical hollow pillar $a$ and concentric inner tube $d$ constitute the air-passages for the supply of air under pressure to the ring-jet $c$ and rose-jet $d^2$, respectively, the said air-passages being controlled by stop-cocks (marked, respectively, $e\,f$) in connection with side tubes or passages $e^2\,f^2$.

In using the soldering table or pan the ignited coke or charcoal is introduced into the pan or hearth $b$, and the article to be soldered is placed on the said ignited coke or charcoal. The combustion of the coke or charcoal is maintained by a blast of air admitted through the stop-cock $e$ or the stop-cock $f$, or through both, and directed into the fuel by the jets $c'\,d^2$ within the pan or hearth $b$, and the article or articles to be soldered are gradually raised to the temperature at which the soldering may be effected. The ordinary blowpipe is ignited and its flame directed onto the article for the purpose of soldering the same, the pan or hearth $b$ being at the same time rotated in one or other direction, so as to facilitate the application of the blowpipe-flame to all the parts of the article under operation.

Having now particularly described and ascertained the nature of the said invention and in what manner the same is to be performed, I declare that I claim as the said invention—

A soldering and brazing pan or table, consisting of a receptacle adapted to contain ignited fuel, a central, vertical tubular axis on which said table may rotate, a concentric tubular ring communicating with the tubular axis and having perforations, a cock for regulating the volume of air passing through the axis and a tube inclosed by said axis and having a regulating-cock, its upper end rising above the tubular ring and having a series of jets, substantially as described.

HENRY THOMAS FELLOWS. [L. S.]

Witnesses:
RICHARD SKERRETT,
ARTHUR J. POWELL.